United States Patent
Sio-Hoi et al.

(10) Patent No.: US 11,335,019 B2
(45) Date of Patent: May 17, 2022

(54) METHOD FOR THE 3D RECONSTRUCTION OF A SCENE

(71) Applicants: UNIVERSITE PIERRE ET MARIE CURIE (PARIS 6), Paris (FR); CENTRE NATIONAL DE LA RECHERCHE SCIENTIFIQUE—CNRS, Paris (FR); INSERM (INSTITUT NATIONAL DE LA SANTE ET DE LA RECHERCHE MEDICALE), Paris (FR)

(72) Inventors: Ieng Sio-Hoi, Montreuil (FR); Benosman Ryad, Pantin (FR); Shi Bertram, Hong Kong (CN)

(73) Assignees: SORBONNE UNIVERSITÉ, Paris (FR); CENTRE NATIONAL DE LA RECHERCHE SCIENTIFIQUE—CNRS, Paris (FR); INSERM (INSTITUT NATIONAL DE LA SANTE ET DE LA RECHERCHE MEDICALE), Paris (FR)

( * ) Notice: Subject to any disclaimer, the term of this patent is extended or adjusted under 35 U.S.C. 154(b) by 0 days.

(21) Appl. No.: 15/556,596

(22) PCT Filed: Mar. 15, 2016

(86) PCT No.: PCT/FR2016/050575
§ 371 (c)(1),
(2) Date: Sep. 7, 2017

(87) PCT Pub. No.: WO2016/146938
PCT Pub. Date: Sep. 22, 2016

(65) Prior Publication Data
US 2018/0063506 A1  Mar. 1, 2018

(30) Foreign Application Priority Data

Mar. 16, 2015 (FR) ...................................... 15 52154

(51) Int. Cl.
*G06T 7/593* (2017.01)
*H04N 13/257* (2018.01)
(Continued)

(52) U.S. Cl.
CPC ........... *G06T 7/593* (2017.01); *H04N 13/239* (2018.05); *H04N 13/257* (2018.05); *H04N 13/296* (2018.05); *H04N 2013/0081* (2013.01)

(58) Field of Classification Search
CPC .. H04N 13/239; H04N 13/257; H04N 13/296; H04N 2013/0081; H06T 7/593; G06T 7/00; G06T 7/593
See application file for complete search history.

(56) References Cited

U.S. PATENT DOCUMENTS

2010/0166315 A1* 7/2010 Paquier ................ G06K 9/4628
382/190
2012/0274627 A1* 11/2012 Huggett ............... H04N 13/246
345/419

(Continued)

FOREIGN PATENT DOCUMENTS

JP    2015-028780 A    2/2015

OTHER PUBLICATIONS

Rogister;"Asynchronous Event-Based Binocular Stereo Matching", IEEE Feb. 2012,XPOI 1406609, ISSN: 2162-237X, DOI: 10.1109/TNNLS.2011.2180025 (Year: 2012).*

(Continued)

*Primary Examiner* — Dramos Kalapodas
(74) *Attorney, Agent, or Firm* — Nixon & Vanderhye

(57) ABSTRACT

The present invention concerns a method for the 3D reconstruction of a scene comprising the matching (610) of a first (Continued)

event from among the first asynchronous successive events of a first sensor with a second event from among the second asynchronous successive events of a second sensor depending on a minimisation (609) of a cost function (E). The cost function comprises at least one component from: —a luminance component ($E_I$) that depends at least on a first luminance signal ($I_u$) convoluted with a convolution core ($g\sigma(t)$), the luminance of said pixel depending on a difference between maximums ($t_{e-,u}, t_{e+,u}$) of said first signal; and a second luminance signal ($I_v$) convoluted with said convolution core, the luminance of said pixel depending on a difference between maximums ($t_{e-,v}, t_{e+,v}$) of said second signal; —a movement component ($E_M$) depending on at least time values relative to the occurrence of events located at a distance from a pixel of the first sensor and time values relative to the occurrence of events located at a distance from a pixel of the second sensor.

11 Claims, 8 Drawing Sheets

(51) Int. Cl.
*H04N 13/296* (2018.01)
*H04N 13/239* (2018.01)
*H04N 13/00* (2018.01)

(56) References Cited

U.S. PATENT DOCUMENTS

| | | | | |
|---|---|---|---|---|
| 2013/0085642 | A1* | 4/2013 | Dankers | G06K 9/605 701/48 |
| 2014/0333730 | A1* | 11/2014 | Benosman | H04N 13/239 348/47 |
| 2015/0030204 | A1* | 1/2015 | Lee | G06T 7/246 382/103 |
| 2015/0077323 | A1* | 3/2015 | Ramaswamy | G06F 3/0304 345/156 |

OTHER PUBLICATIONS

Kogler;"Event-Based Stereo Matching Approaches for Frameless Address Event Stereo Data", Sep. 26, 2011 (Sep. 26, 2011), Advances in Visual Computing, Springer Berlin Heidelberg, Berli (Year: 2011).*

Paul Register et al., ; "Asynchronous Event-Based Binocular Stereo Matching", IEEE Transactions on Neural Networks and Learning Systems, IEEE, Piscataway, NJ, USA, vol. 23, No. 2, Feb. 1, 2012,XPOI 1406609, ISSN: 2162-237X, DOI: 10.1109/TNNLS. 2011.2180025 (Year: 2012).*

Jurgen Kogler et al., ; "Event-Based Stereo Matching Approaches for Frameless Address Event Stereo Data", Sep. 26, 2011 (Sep. 26, 2011), Advances in Visual Computing, Springer Berlin Heidelberg, Berlin, Heidelberg, XP019166064, ISBN: 978-3-642-24027-0 (Year: 2011).*

Luis Comunas-Mesa et al., ; "An Event Driven Multi-Kernel Convolution Processor Module for Event-Driven Vision Sensors"; 0018-9200 © 2011 IEEE (Year: 2011).*

Heiki Hirschmuller "Stereo Processing by Semiglobal Matching and Mutuall Information"; 0162-8828/08 © 2008 IEEE (Year: 2008).*

Posch Christoph et al: "Retinomorphic Event-Based Vision Sensors: Bioinspired Cameras With Spiking Output", vol. 102, No. 10, Oct. 1, 2014 (Oct. 1, 2014), pp. 1470-1484, XPOI 1559302, ISSN: 0018-9219,IEEE DOI: 10.1109/JPROC.2014.2346153 (Year: 2014).*

Jürgen Kogler, et al., Event-Based Stereo Matching Approaches for Frameless Address Event Stereo Data, International Symposium on Visual Computing, 2011, pp. 674-685, Springer-Verlag Berlin Heidelberg.

Paul Rogister, et al., Asynchronous Event-Based Binocular Stereo Matching, IEEE Transactions on Neural Networks and Learning Systems, Feb. 2012, pp. 347-353, vol. 23, No. 2.

Christoph Posch, et al., Retinomorphic Event-Based Vision Sensors: Bioinspired Cameras With Spiking Output, Proceedings of the IEEE, Oct. 2014, pp. 1470-1484, vol. 102, No. 10.

Tobi Delbrück et al., "Activity-Driven, Event-Based Vision Sensors", Proceedings of 2010 IEEE International Symposium on Circuits and Systems (ISCAS), 2010, pp. 2426-2429.

Christoph Sulzbachner et al., "An Optimized Silicon Retina Stereo Matching Algorithm Using Time-space Correlation", CVPR 2011 Workshops, United States, IEEE, Jun. 25, 2011, pp. 1-7.

Shoichi Nagao et al., "High Speed Tracking of Moving Objects and Depth Estimation by using Smart Image Sensor and FPGA", Journal of The Institute of Image Information and Television Engineers, Japan, The Institute of Image Information and Television Engineers, Sep. 1, 2003, vol. 57, No. 9, pp. 1142-1148.

Jun Haeng Lee et al., "Real-Time Gesture Interface Based on Event-Driven Processing from Stereo Silicon Retinas", IEEE Transactions on Neural Networks and Learning Systems, United States, IEEE, Mar. 17, 2014, vol. 25, No. 12, pp. 2250-2263.

Ewa Piatkowska et al., "Asynchronous Stereo Vision for Event-Driven Dynamic Stereo Sensor Using an Adaptive Cooperative Approach", 2013 IEEE International Conference on Computer Vision Workshops, United States, IEEE, Mar. 6, 2014, pp. 45-50.

\* cited by examiner

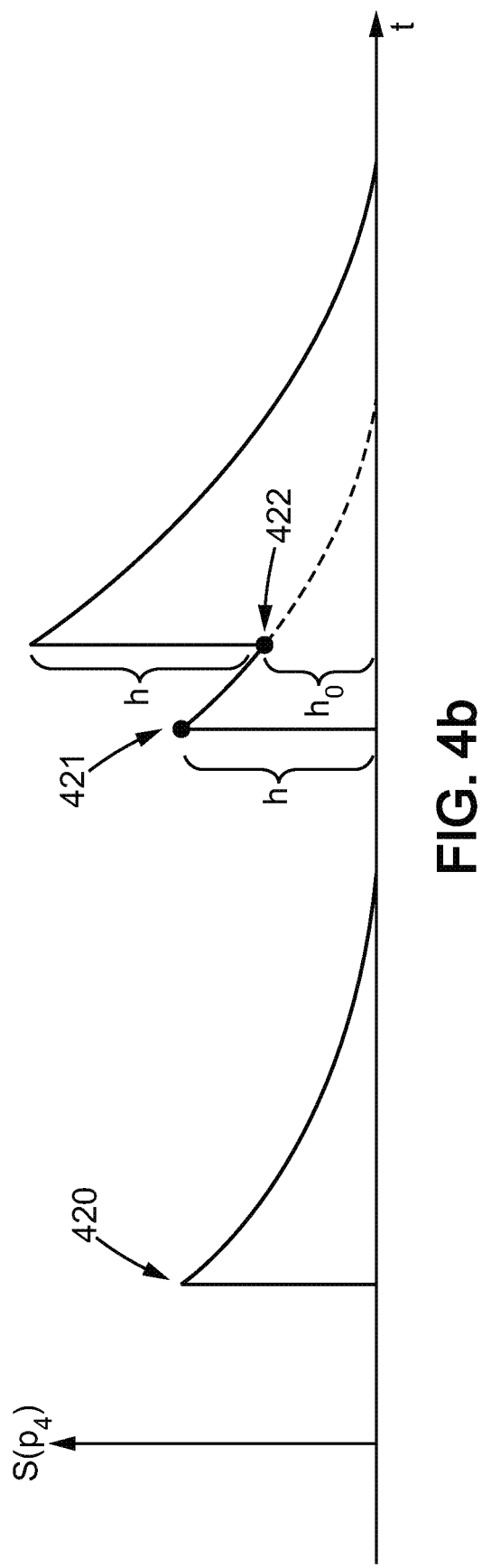

METHOD FOR THE 3D RECONSTRUCTION OF A SCENE

BACKGROUND OF THE INVENTION

Field Of The Invention

The present invention relates to the area of the 3D reconstruction of a scene, in particular when it is captured using asynchronous sensors.

Description Of The Related Art

Contrary to standard cameras which record successive images at regular sampling moments, the biological retinas only transmit a little repetitive information about the scene to view, and this, asynchronously.

Event-based asynchronous vision sensors deliver compressed digital data in the form of events.

A presentation of such sensors can be viewed in "*Activity-Driven, Event-Based Vision Sensors*", T. Delbrück, et al., Proceedings of 2010 IEEE International Symposium on Circuits and Systems (ISCAS), pp. 2426-2429. Event-based vision sensors have the advantage of increasing repetition, reducing latency time and increasing the range of time dynamics and grey levels compared with standard cameras.

The output of such a vision sensor can consist, for each pixel address, of a sequence of asynchronous events, representative of changes in the reflectance of the scene at the time they are produced.

Each pixel of the sensor is independent, and detects changes in light intensity higher than a threshold, from the transmission of the last event (for example, a contrast of 15% on the intensity logarithm). When the change in intensity exceeds the threshold set, an ON or OFF event is generated by the pixel according to whether the intensity increases or decreases (DVS sensors). Certain asynchronous sensors connect detected events to absolute measurements of light intensity (ATIS sensors).

The sensor, not being sampled on a clock like a standard camera, it can chart the sequencing of events with a very high time precision (for example, around 1 µs). If such a sensor is used to reconstruct a sequence of images, a rate of images of several kilohertz can be achieved, compared with a few dozen hertz for standard cameras.

Moreover, in the framework of the 3D reconstruction of a scene, for each one of the pixels of the sensors, a calculation of the position in space is made. In order to achieve this, there are many methods using several cameras or other standard sensors. Consequently, these methods achieve determinations using standard 2D images wherein the pixels have at least one value (that is, they are defined).

For asynchronous sensors, such as previously defined, such methods cannot be applied by definition, as no "standard" 2D image is not available exiting the sensors: in order to use these methods, it would be necessary to artificially "reconstruct" 2D images from asynchronous information from the sensors. However, this reconstruction can be heavy and handling complete images can require consequent processing means. In addition, this reconstruction discretises time information and thus, the time dependency of the visual information is practically ignored.

Consequently, there is a need to develop 3D scene reconstruction methods, methods suitable for asynchronous sensors.

BRIEF SUMMARY OF THE INVENTION

The present invention aims to improve the situation.

To this end, the present invention proposes a method, especially suited to asynchronous sensors to reconstruct scenes observed in 3D.

The present invention therefore aims for a method for the 3D reconstruction of a scene, the method comprising:
reception of a first piece of asynchronous information from a first sensor that has a first pixel matrix positioned opposite the scene, the first piece of asynchronous information comprising, for each pixel of the first matrix, first successive events coming from said pixel;
reception of a second piece of asynchronous information from a second sensor that has a second pixel matrix positioned opposite the scene, the second piece of asynchronous information comprising, for each pixel of the second matrix, second successive events coming from said pixel, the second sensor being separate from the first sensor;
matching of a first event from amongst the first successive events with a second event from amongst the second successive events according to a minimisation of a cost function;
wherein the cost function comprises at least one component from amongst:
a luminance component, said luminance component depending on at least:
one first luminance signal coming from a pixel from the first convoluted sensor with a convolution core, the luminance of said pixel depending on a difference between the maximums of said first signal; and
one second luminance signal coming from a pixel from the second convoluted sensor with said convolution core, the luminance of said pixel depending on a difference between the maximums of said second signal;
a movement component, said movement component depending on at least:
time values relating to the occurrence of events spatially located at a predetermined distance from a pixel of the first sensor;
time values relating to the occurrence of events spatially located at a predetermined distance from a pixel of the second sensor.

Thus, it is not necessary, for the reconstruction of 3D scenes captured using several DVS or ATIS asynchronous sensors, to recreate standard 2D images for using methods of the prior art applicable to these images.

Consequently, the precision of such a 3D reconstruction is very precise/large, the asynchronous time information being a lot more precisely sampled.

Moreover, the cost function can additionally comprise:
a time component, said time component depending on a difference between:
a time value relating to an event of the first sensor;
a time value relating to an event of the second sensor.

It is therefore possible to avoid events that are too separate time-wise being connected.

In a specific embodiment, the cost function can additionally comprise:
a geometric component, said geometric component depending on:
a spatial distance of a pixel of the second sensor at an epipolar straight line or at an intersection of epipolar straight lines defined by at least one pixel from the first sensor.

It is therefore possible to avoid events not corresponding to the same point X(t) of the scene being connected.

Advantageously, the luminance signal of the pixel of the first sensor and of the pixel of the second sensor comprising a maximum, coding an occurrence time of a luminance variation, the convolution core can be a predetermined Gaussian variance.

In a specific embodiment, said luminance component can additionally depend on:
luminance signals of pixels of the first sensor, spatially located at a predetermined distance from the first pixel of the first sensor, convoluted with the convolution core; and
luminance signals of pixels of the second sensor, spatially located at a predetermined distance from the second pixel of the second sensor, convoluted with the convolution core.

Consequently, considering events close to pixels to be connected enables to check if the whole corresponds, and check that the fact of obtaining a local correspondence for two pixels is not a simple artefact or a simple singularity.

In addition, said movement component can additionally depend on:
an average value of the time values relating to the occurrence of pixel events of the first sensor, spatially located at a predetermined distance from the pixel of the first sensor;
an average value of the time values relating to the occurrence of pixel events of the second sensor, spatially located at a predetermined distance from the pixel of the second sensor.

In a specific embodiment, said movement component can depend on, for a given time:
for each current time value relating to the occurrence of events spatially located at a predetermined distance from a pixel of the first sensor, a function value, decreasing from a distance of said given time to said current time value;
for each current time value relating to the occurrence of events spatially located at a predetermined distance from a pixel of the second sensor, a function value, decreasing from a distance of said given time to said current time value.

In an alternative embodiment, said movement component can depend on:
a first convolution of a decreasing function with a signal comprising a Dirac for each time value relating to the occurrence of events spatially located at a predetermined distance from a pixel of the first sensor;
a second convolution of a decreasing function with a signal comprising a Dirac for each time value relating to the occurrence of events spatially located at a predetermined distance from a pixel of the second sensor.

The present invention also aims for a device for the 3D reconstruction of a scene, the method comprising:
an interface for receiving a first piece of asynchronous information from a first sensor that has a first pixel matrix positioned opposite the scene, the first piece of asynchronous information comprising, for each pixel of the first matrix, first successive events coming from said pixel;
an interface for receiving a second piece of asynchronous information from a second sensor that has a second pixel matrix positioned opposite the scene, the second piece of asynchronous information comprising, for each pixel of the second matrix, second successive events coming from said pixel, the second sensor being separate from the first sensor;
a processor suitable for matching a first event from amongst the first successive events with a second event from amongst the second successive events depending on a minimisation of a cost function;
wherein the cost function comprises at least one component from amongst:
a luminance component, said luminance component depending on at least:
a first luminance signal coming from a pixel of the first sensor convoluted with a convolution core, the luminance of said pixel depending on a difference between maximums of said first signal; and
a second luminance signal coming from a pixel of the second sensor convoluted with said convolution core, the luminance of said pixel depending on a different between the maximums of said second signal;
a movement component, said movement component depending on at least:
time values relating to the occurrence of events spatially located at a predetermined distance from a pixel of the first sensor;
time values relating to the occurrence of events spatially located at a predetermined distance from a pixel of the second sensor.

A computer program, implementing all or part of the method described above, installed on pre-existing equipment, is advantageous in itself.

Thus, the present invention also aims for a computer program comprising instructions for the implementation of the method previously described, when this program is executed by a processor.

This program can use any programming language (for example, object language or other), and be in the form of an interpretable source code, a partially compiled code or a totally compiled code.

FIG. 6 described in detail below, can form the general algorithm flowchart of such a computer program.

BRIEF DESCRIPTION OF THE DRAWINGS

Other characteristics and advantages of the invention will again appear upon reading the description that will follow. This is purely illustrative and must be read while looking at the appended drawings whereon:

FIGS. 4a and 4b are representative examples of an activity signal of a given pixel;

FIG. 1 illustrates the ATIS principle.

Figure 1:
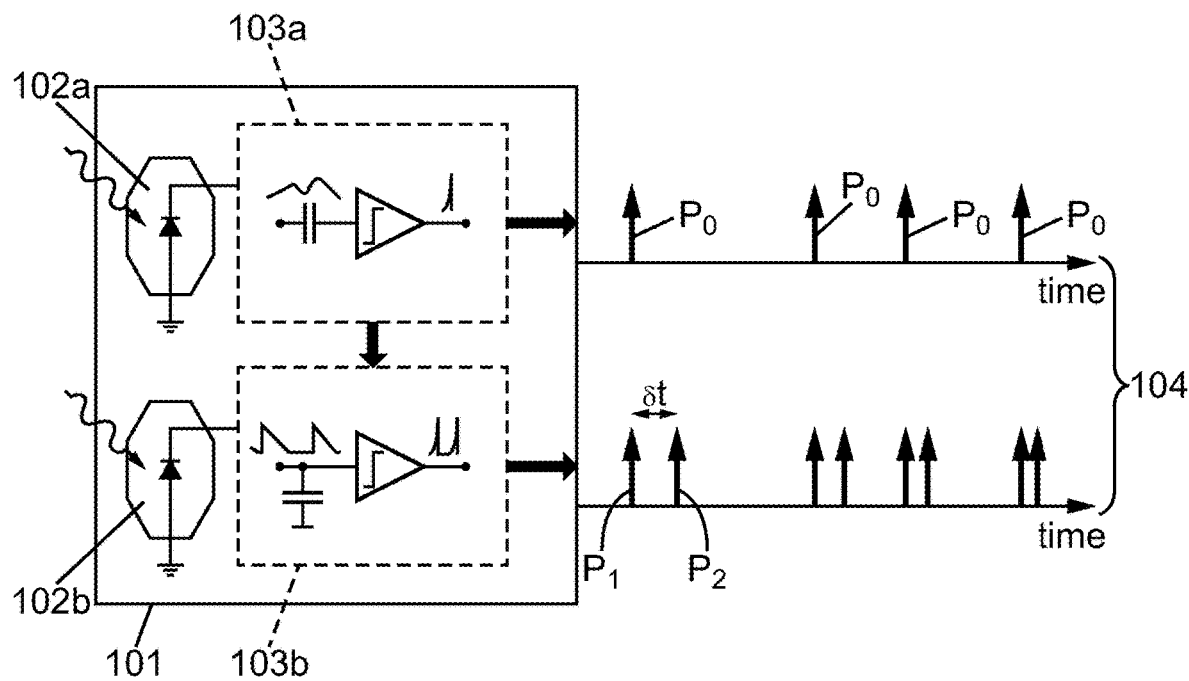
FIG. 1 is an overview drawing of an ATIS asynchronous light sensor.

A pixel 101 of the matrix constituting the sensor comprises two photosensitive elements 102a, 102b, such as photodiodes, respectively connected to electronic detection circuits 103a, 103b.

The sensor 102a and its circuit 103a produce a pulse $P_0$ when the light intensity received by the photodiode 102a varies from a predefined quantity.

DETAILED DESCRIPTION OF THE PREFERRED EMBODIMENTS

The pulse $P_0$ marking this change in intensity triggers the electronic circuit 103b connected to the other photodiode 102b. This circuit 103b then generates a first pulse $P_1$ then a second pulse $P_2$ as soon as a given quantity of light (number of photons) is received by the photodiode 102b.

The time difference $\delta t$ between the pulses $P_1$ and $P_2$ is inversely proportional to the light intensity received by the pixel 101 just after the appearance of the pulse $P_0$.

The asynchronous information coming from the ATIS comprises two combined pulse trains for each pixel (104): the first pulse train $P_0$ indicates the moments when the light intensity has changed beyond the detection threshold, while the second train is composed of pulses $P_1$ and $P_2$ of which the time difference $\delta t$ indicates corresponding light intensities or grey levels.

An event e(p, t) coming from a pixel 101 of position p in the matrix in the ATIS thus comprises two types of information: a time-related piece of information given by the position of the pulse $P_0$, giving the moment t of the event, and a piece of grey level information given by the time difference $\delta t$ between the pulses $P_1$ and $P_2$.

Figure 2:
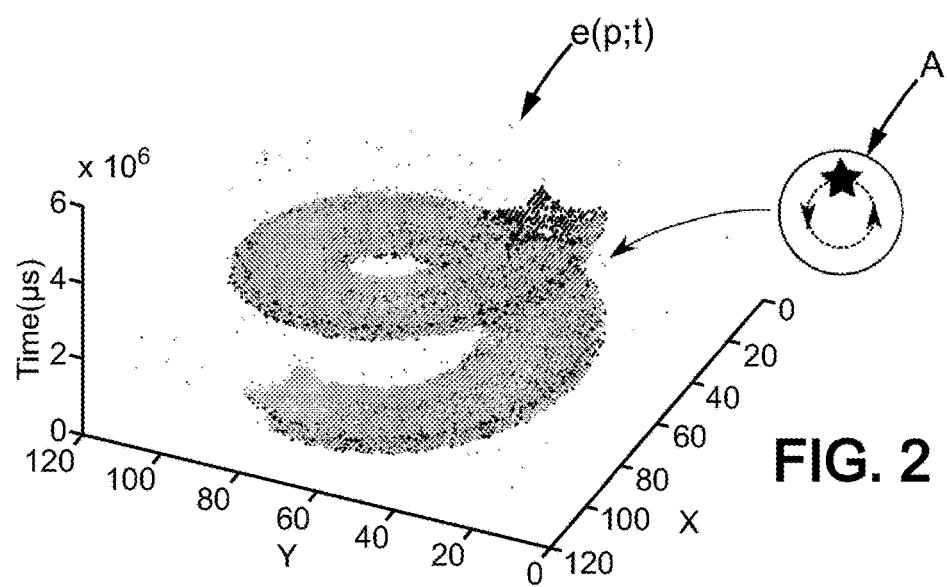
FIG. 2 is a diagram showing the events generated by an asynchronous sensor positioned opposite a scene comprising a rotating star.

Events coming from pixels in a three-dimensional space/time representation such as that presented in FIG. 2 can then be placed. In this figure, each point p identifies an event e(p, t) asynchronously generating a moment t at the level of a pixel p of the sensor, of position=$(_y^x)$, by the movement of a star rotating at a constant angular speed as shown in a diagram in box A. The major part of these points is distributed close to a surface of a general helicoidal form. In addition, the figure shows a certain number of events at a distance from the helicoidal surface, which are measured without corresponding to the actual movement of the star. These events are from the noise of acquisition.

The events e(p, t) can then be defined by all the following information:

$$e(p, t) = \begin{cases} p \in C \subset \mathbb{R}^2 \\ pol \\ I(p, t) \end{cases}$$

with C the spatial area of the sensor, pol the polarity representing the direction of the luminance change (for example, 1 for an increase or −1 for a decrease) and I(p, t) the light intensity signal of the point p at the moment t.

The light intensity signal can thus be all the pulse trains combined 104 such as described in FIG. 1. If $t_u$ represents the time of the occurrence of the event, and the difference between $t_{e+,u}$ and $t_{e-,u}$ represents a value inversely proportional to the light intensity received, it is possible to code the intensity using three Diracs $\delta$ in such a way that $I(p, t)=\delta(t-t_u)+\delta(t-t_{e+,u})+\delta(t-t_{e-,u})$. The pixel intensity signal located at coordinate p thus enables luminance information to be coded temporally. This information can come directly from the electronic circuit of the sensor with a minimum amount of transformation.

Figure 3:
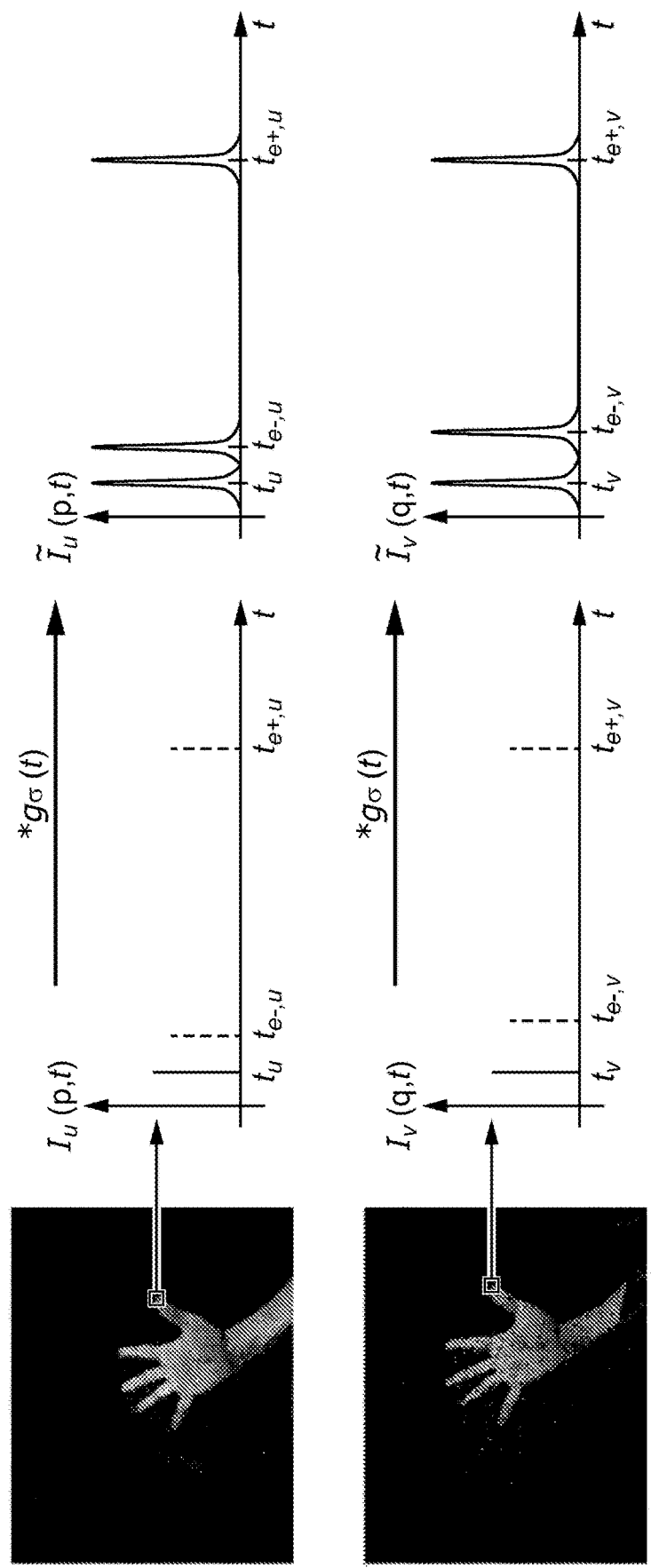
FIG. 3 is an example of the calculation of a luminance component for two points of two separate sensors.

FIG. 3 is an example of the calculation of a luminance component for two points p and q of two separate sensors u and v.

In order to determine if two points p and q of two sensors correspond to the same point of the scene observed, there is a hypothesis that the surfaces comprising the scene observed are Lambert surfaces (that is, surfaces of which the luminance is the same, whatever the angle of observation).

Consequently, for these surfaces, the intensity must be the same for the two sensors at one same moment, that is, $I_u(p, t)=I_v(q, t)$.

It is, for example, possible to calculate a correlation between these two signals $I_u(p, t)$ and $I_v(q, t)$.

In order to be able to simply compare the Dirac-composed light intensity signals, it can be advantageous to convolute these signals by a non-void support core $g_o(t)$. It is then possible to calculate a correlation between the two signals $I_u(p, t)*g_o(t)= \tilde{I}_u (p, t)$ and $I_v(q, t)*g_o(t)= \tilde{I}_u (p, t)$.

Moreover, it can be useful to not limit the comparison of two single points, but to also consider the points located close to p and q (that is, located at a predetermined distance from p or q, distance in the mathematical sense of the term): all the points close to p define a set $v_u(p)$ and all points close to q define a set $v_v(q)$ (N is the cardinal of these sets). Thus, the luminance component can be expressed as follows:

$$E_l = 1 - \frac{1}{N} \sum_{\substack{p_i \in v_u(p) \\ q_i \in v_v(q)}} \frac{\int_{-\infty}^{+\infty} \tilde{I}_u(p_i, t)\tilde{I}_v(q_i, t)dt}{\sqrt{\int_{-\infty}^{+\infty} \tilde{I}_u(p_i, t)^2 dt} \sqrt{\int_{-\infty}^{+\infty} \tilde{I}_v(q_i, t)^2 dt}}$$

Of course, it is possible to reduce the integration terminals by defining w the support of convoluted functions $\tilde{I}(\bullet)$ for all points located close to p or q such as defined above.

$$E_l = 1 - \frac{1}{N} \sum_{\substack{p_i \in v_u(p) \\ q_i \in v_v(q)}} \frac{\int_\omega I_u(p_i, t)I_v(q_i, t)dt}{\sqrt{\int_\omega \tilde{I}_u(p_i, t)^2 dt} \sqrt{\int_\omega \tilde{I}_v(q_i, t)^2 dt}}$$

Finally, it is possible to generalise this formula by using more than two sensors. For example, with Q sensors {u, v, w, . . . }, it is possible to write:

$$E_l = 1 - \frac{1}{(Q-1)N} \sum_{\substack{p_i \in v_u(p) \\ q_{ci} \in v_c(q_c) \\ c \in \{v,w,...\}}} \frac{\int_\omega I_u(p_i, t)\tilde{I}_c(q_{ci}, t)dt}{\sqrt{\int_\omega \tilde{I}_u(p_i, t)^2 dt} \sqrt{\int_\omega \tilde{I}_c(q_{ci}, t)^2 dt}}$$

The core $g_o(t)$ is advantageously a Gaussian variance a. It can also be a door width function $\sigma$.

Figure 4A:
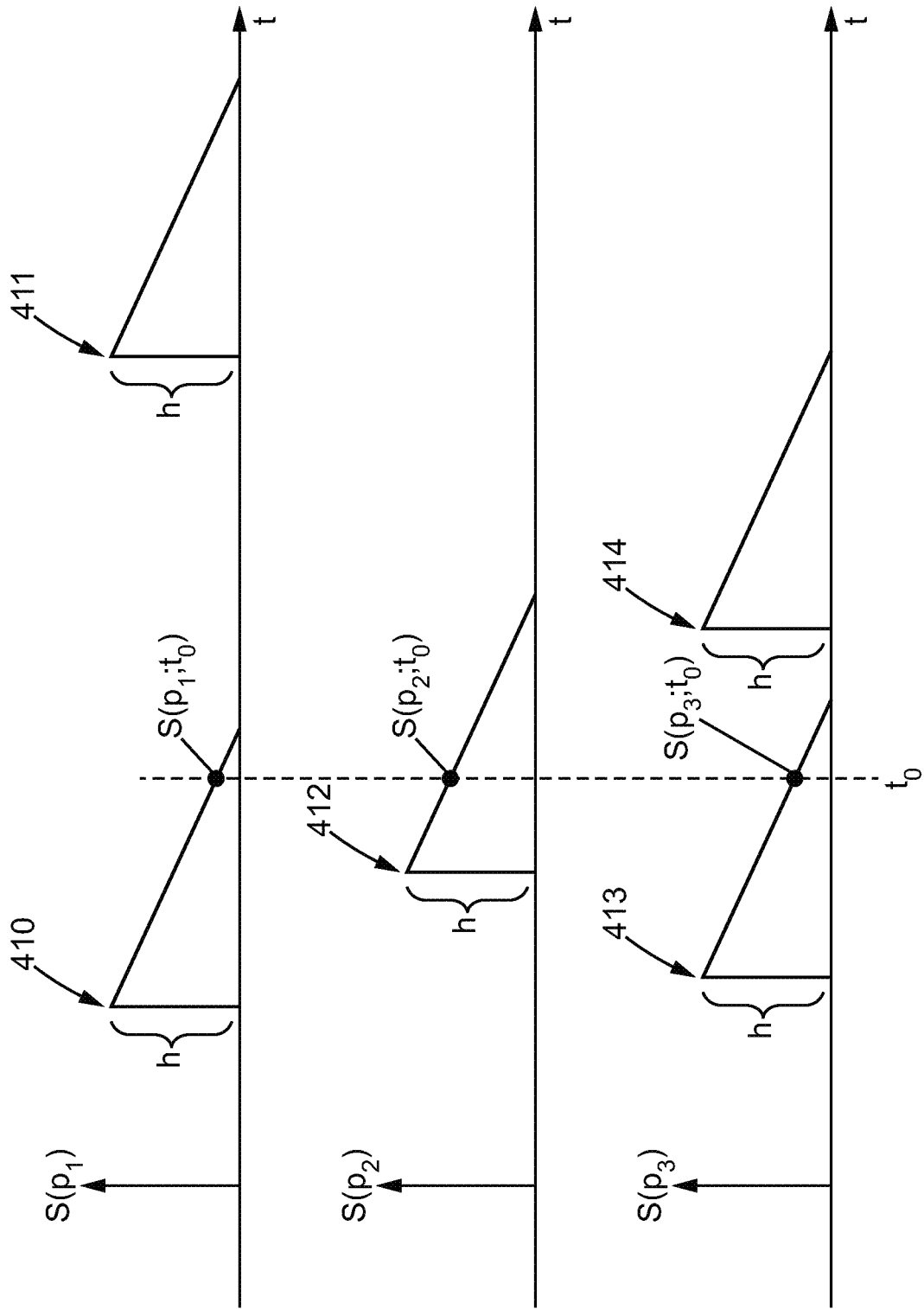
Figure 4C:
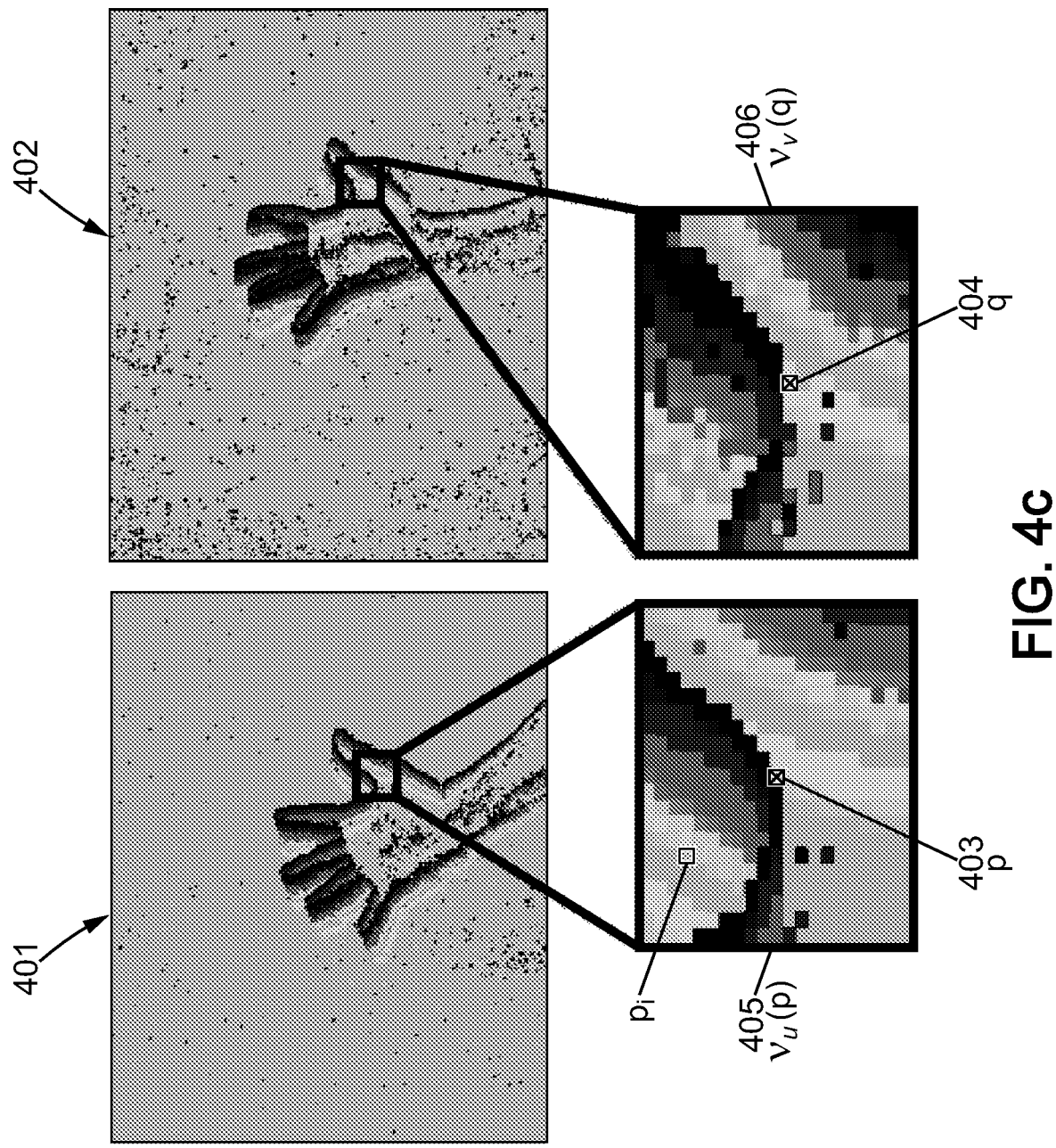
FIG. 4c µs a representation of movement cards generated using separate asynchronous sensors.

FIG. 4c μs a representation of cards 401 and 402 generated using separate asynchronous sensors.

To generate these cards, it is possible to define the function S as the sum, for each event $$ev_p(i) = \begin{cases} p_i = p \\ pol_i = pol \\ t_p \end{cases}$$

of a given pixel p and for a given polarity pol, at a given moment t, of the language primitive $$S_{prim}(p, pol, t) = \begin{cases} \max(h + \theta \cdot (t_p - t), 0) & \text{if } t \geq t_p \\ 0 & \text{otherwise} \end{cases},$$

h being a predetermined value and $\theta$ being a predetermined factor corresponding to the speed of the decreasing of the language primitive.

The "sum" of the language primitive can also be seen mathematically as a convolution:
of the language primitive $$S_{prim}(p, t) = \begin{cases} \max(h - \theta \cdot t, 0) & \text{if } t \geq 0 \\ 0 & \text{otherwise} \end{cases}$$

(or more generally, any decreasing function),
with a signal comprising a Dirac for each time t, to which an event $ev_p(i)=$ $$\begin{cases} p_i = p \\ pol_i = pol \\ t_p \end{cases} \text{occurs.}$$

As an illustration, FIG. 4a shows three possible activity signals t→S, for three pixels $p_1$, $p_2$ and $p_3$ of the sensor (and for a given polarity value pol).

In the absence of events, the value of $S(p_1, t)$, $S(p_2, t)$ or $S(p_3, t)$ is zero. However, at the time of the occurrence of a polarity event pol (for example, 410) at the level of the pixel $p_1$, $S(p_1, t)$ takes a predetermined threshold value (here h, this value h could be unitary).

The value of the activity signal $S(p_1, t)$ then progressively decreases after this event to reach towards 0.

This is the same for the event 411 for the pixel $p_1$, for the event 412 for the pixel $p_2$, or for the event 413/414 for the pixel $p_3$.

If the decrease of the activity signal S here is linear, it is possible to anticipate any type of decrease as an exponential decrease:

$$h \cdot e - \frac{t - t_p}{\tau}$$

This exponential decrease can be illustrated by FIG. 4b (see the curve 4b and the event 320).

Moreover, it is possible that, at the time of the occurrence of an event for the pixel considered (for example, $p_4$ here), the value of the function S is not negligible in relation to the value of h (for example, the event 421 is temporally close to the event 422).

In an embodiment, at the time of the occurrence of the later event 422, the value of the activity signal S can be set to the sum (possibly weighted) of the current value of S, just before the event 422 (that is, $h_0$) and of h. Thus, the decrease in the curve S will start from the value $h+h_0$ as FIG. 4b shows. Moreover, it is possible to anticipate that the value of $h+h_0$ is capped at a predetermined value h1 (that is, min($h_1$, $h+h_0$)).

In another embodiment, at the time of the occurrence of the later event 422, the value of the curve S is set to the value h, whatever the value of $h_0$ (that is, the previous events to the last event (that is, the later event) are ignored). In this other embodiment, it is possible to define a time known as "last event time" defined as follows:

$$T(p,pol,i)=\max(t_j)|j<i$$

or $$T(p,pol,t)=\max(t_j)|t_j<t$$

with $t_j$ event times occurring for the pixel for a pixel p with the polarity pol.

Conceptually, p→T(p, pol, t) defines a time card of the last events of the same polarity that have occurred temporally, just before a reference time (that is, t).

It can therefore be defined, in this other embodiment, p→S(p, pol, t) as being as a function of this set of time T(p, pol, t).

For example, p→S(p, pol, t):

$$p \to S(p, pol, t): \begin{cases} h \cdot e - \frac{t - T(p, pol, t)}{\tau} & \text{if } t \geq T(p, pol, t) \\ 0 & \text{otherwise} \end{cases}$$

with $\tau$ and h a predetermined time constant (S can be any decreasing function with time t over an interval comprising as a lower terminal T(p, pol, t)).

The creation of a pixel card S representative of the "freshness" of events of these pixels is advantageous, as it enables a continuous and simple representation of discontinuous concepts (that is, events). This created card enables the representation of events to be transformed into a simple area of understanding.

Consequently, its creation simplifies the handling and comparison of events.

This function S is representative of a "freshness" of events that have occurred for this pixel.

The cards 401 and 402 of the FIG. 4c are representations of this function S for a given time t and for two asynchronous sensors capturing the movement of one same hand from two different viewpoints.

The darkest points represent the points of which the last events are the most recent in relation to time t (that is, having the largest S value).

The clearest points represent the points of which the last events are the most distant in relation to time t (that is, having the smallest S value, the background of the image is greyed to make the clear values stand out more easily, although the background corresponds to zero values of the function S).

The dispersed darkened points correspond to a sensor capture noise.

For each event occurring on the date $t_0$, it is possible to determine a movement card for the pixel p. Consequently, each pixel p of the card has, as a value, $S(p, t_0)$.

In order to determine if two points p and q of two sensors correspond to the same point of the scene observed, it is assumed that the S value of the two sensors at the respective points p and q will be similar (this is not necessarily the case in certain limited situations), either S(p)=S(q) or at the least, S(p)≈S(q).

It is, for example, possible to calculate a correlation between these two values S(p) and S(q) Moreover, it can be useful to not limit the comparison of two single points, but to also consider the points located close to p (403) and q (404) (that is, located at a predetermined distance from p or q, a distance in the mathematical sense of the term): all the points close to p define a set $v_u(p)$ (405) and all the points close to q define a set $v_v(q)$ (406) (N is the cardinal of these sets).

It is possible to determine the correlation of two cards 405 and 406 close to points p and q. In addition, it is possible, in order to free a sensor from any time difference, to subtract their average respective optical flows 405 and 406 from each one (respectively $\overline{S_u}(p)$ and $\overline{S_v}(q)$).

Thus, the movement component, for a given moment t, can be expressed as follows:

$$E_M = 1 - \frac{1}{2}\sum_{i=1}^{N} \frac{(S_u(p_i) - \overline{S_u}(p))(S_v(q_i) - \overline{S_v}(q))}{|S_u(p_i) - \overline{S_u}(p)||S_v(q_i) - \overline{S_v}(q)|}$$

with i the index of a point in the set $v_u(p)$ and of a point in the set $v_v(q)$.

Finally, it is possible to generalise this formula by using more than two sensors. For example, with Q sensors {u, v, w, . . . }, it is possible to write (by using the same notations as were used previously for the luminance component):

$$E_M = 1 - \frac{1}{Q-1}\sum_{c\in\{v,w,...\}}\sum_{i=1}^{N} \frac{(S_u(p_i) - \overline{S_u}(p))(S_c(q_{ci}) - \overline{S_c}(q_c))}{|S_u(p_i) - \overline{S_u}(p)||S_c(q_{ci}) - \overline{S_c}(q_c)|}$$

Figure 5A:
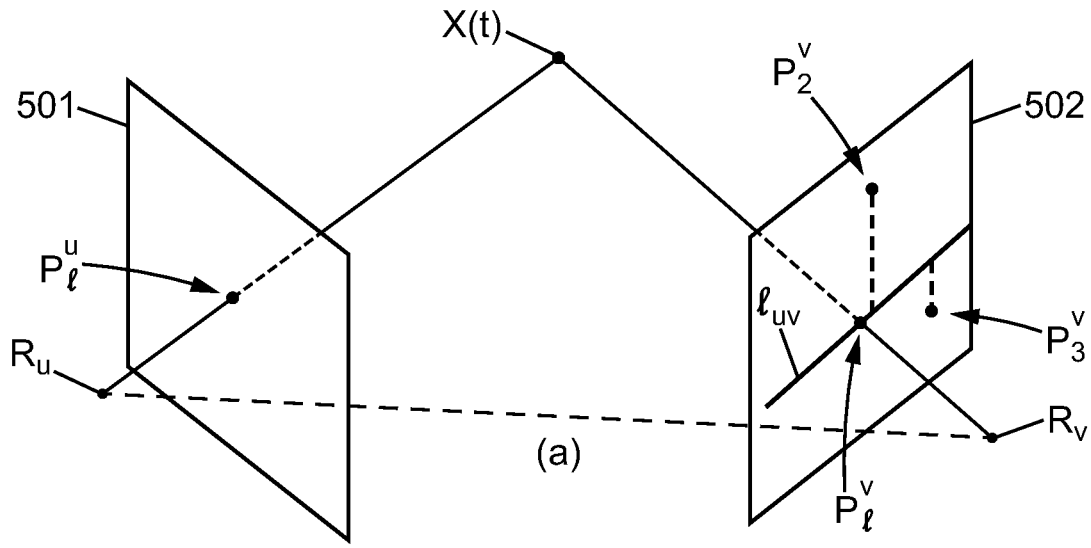
FIGS. 5a and 5b are representations of examples of calculations of geometric components in an embodiment of the invention.
Figure 5B:
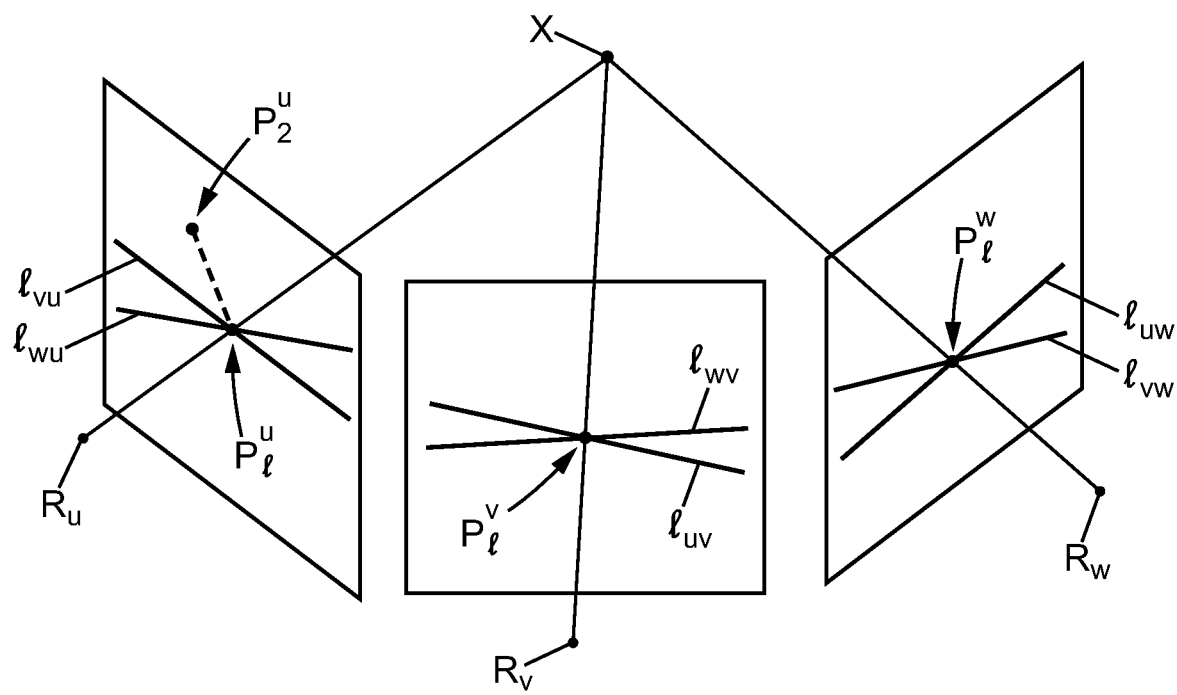

FIGS. 5a and 5b are representations of examples of calculating geometric components in an embodiment of the invention.

When two sensors 501 and 502 are opposite one same scene (for example, a scene comprising the point X(t), see FIG. 5a), and if the point $p_1^u$ of the first sensor 501 representative of the point X(t) (that is, the point $p_1^u$, X(t) and $R_u$ are aligned), it is possible to define an epipolar straight line $l_{uv}$ on the sensor 502.

$R_u$ is the centre of projection of the sensor 501 and $R_v$ is the centre of projection of the sensor 502.

This epipolar straight line $l_{uv}$ is defined as being the intersection of the plane (X(t), $R_u$, $R_v$) with the sensor 502.

More generally, a point p of the last sensor 501 defines an epipolar straight line $l_v(p)$ on the second sensor 502 and a point q of the second sensor 502 defines an epipolar straight line $l_u(q)$ on the first sensor 501.

Consequently, it is possible to define a geometric component for two points p and q of the first and second sensors:

$$E_G = \frac{1}{2\epsilon_g}(d(p, l_u(q)) + d(q, l_v(p)))$$

If the shooting device comprises three sensors (see FIG. 3b), two epipolar straight lines can be defined per sensor, these straight lines being defined by the points considered on the two other sensors. Thus, these two epipolar straight lines then have an intersection, that below is called an epipolar intersection. Consequently:

a point p of the first sensor and a point q of the second sensor define an epipolar intersection $i_w(p, q)$ on the third sensor;

a point p of the first sensor and a point r of the third sensor define an epipolar intersection $i_v(p, r)$ on the second sensor;

a point q of the second sensor and a point r of the third sensor define an epipolar intersection $i_u(q, r)$ on the first sensor.

Thus, it is possible to define a geometric component for three points p, q and r of the first, second and third sensors:

$$E_G = \frac{1}{3\epsilon_g}(d(p, i_u(q, r)) + d(q, i_v(p, r)) + d(r, i_w(p, q)))$$

with $\epsilon_g$ a predetermined value of a distance representative of a maximum acceptable geometric difference.

If the shooting device comprises more than three sensors (for example, Q sensors), it is possible to generalise the previous formula, by considering that the epipolar intersection of a sensor is the point located the closest to the set of epipolar straight lines defined on this sensor by current points of the other sensors (for example, by minimising the sum of the distances or by minimising the square of the distances of said points to the epipolar straight lines).

$$E_G = \frac{1}{Q\epsilon_g}\left(\sum_{c\in\{u,v,w,...\}} d(p_c, i_c(\{p_d\}_{d\in\{u,v,w,...\}\backslash c}))\right)$$

It is also possible to determine a time component for an event $e(p, t_u)$ of the first sensor and an event $e(q, t_v)$ of the second sensor:

$$E_T = \frac{|t_u - t_v|}{\epsilon_t}$$

with $\epsilon_t$ a number that has the dimension of time and is representative of a maximum acceptable time difference between these two events.

If the shooting device comprises more than three sensors (for example, Q sensors), it is possible to generalise the previous formula:

$$E_T = \frac{\sum_{c=\{v,w,...\}} |t_u - t_c|}{Q\epsilon_t}$$

Figure 6:
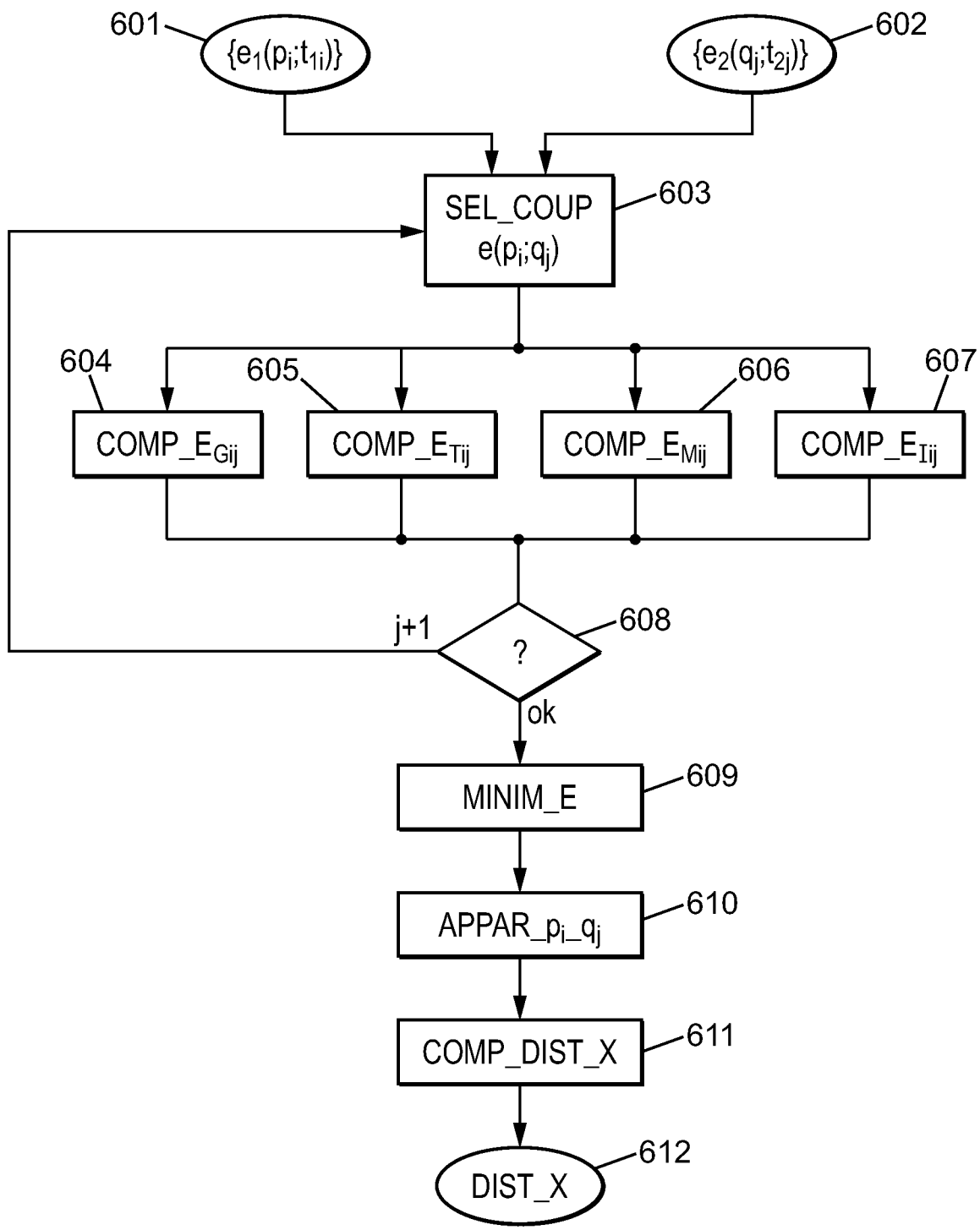
FIG. 6 illustrates a flowchart presenting an embodiment according to the invention.

FIG. 6 illustrates a flowchart presenting an embodiment according to the invention.

Upon receipt of two sets of asynchronous events 601 and 602 coming from two separate asynchronous sensors, and compared with one same scene, it is possible to select two events from these sensors (step 603, defined by the pixel $p_i$ and time $t_{1i}$ for the first sensor and the pixel $q_j$ and time $t_{2j}$ for the second sensor).

Once these events are selected, it is possible to determine at least one component from amongst the following components, as stated above:

a geometric component (step 604);

a time component (step 605);

a movement component (step 606);

a luminance component (step 607).

For an event $e_1(p_i, t_{1i})$ set for the first sensor, it is possible to iterate (test 608, output j+1) over a large number of events $e_2(q_j, t_{2j})$ (by making the index j vary, for example): iterations can outline all the events of the second sensor or advantageously only a subset of these events (for example, only those located at a predetermined geometric distance from the epipolar straight line or from the epipolar intersection defined by at least $p_1$ and/or only those located at a predetermined time distance of time $t_{1i}$).

Once the iterations have ended (test 608, output OK), it is possible to determine the event $e_2(q_j, t_{2j})$ minimising a cost function E for an event $e_1(p_i, t_{1i})$ set (step 609). The cost function can be, for example, a simple sum ($E=E_T+E_M+E_G+E_I$) or a weighted sum ($E=\omega_T E_T+\omega_M E_M+W_G E_G+\omega_I E_I$) of the components previously calculated (any other function involving these components is also possible).

It has been observed through experiments, that a cost function considering a luminance component and/or a movement component would enable the precision of 3D reconstructions made to be significantly increased.

Once the minimisation has been carried out, it is possible to connect the points $p_i$ and $q_j$ (step 610), and thus calculate the distances or the position in the space of the point X(t) of the scene observed, representative of the connected points $p_i$ and $q_j$ (step 611).

The distances calculated (or the position of the point X(t) in the space) are then returned (612).

Figure 7:
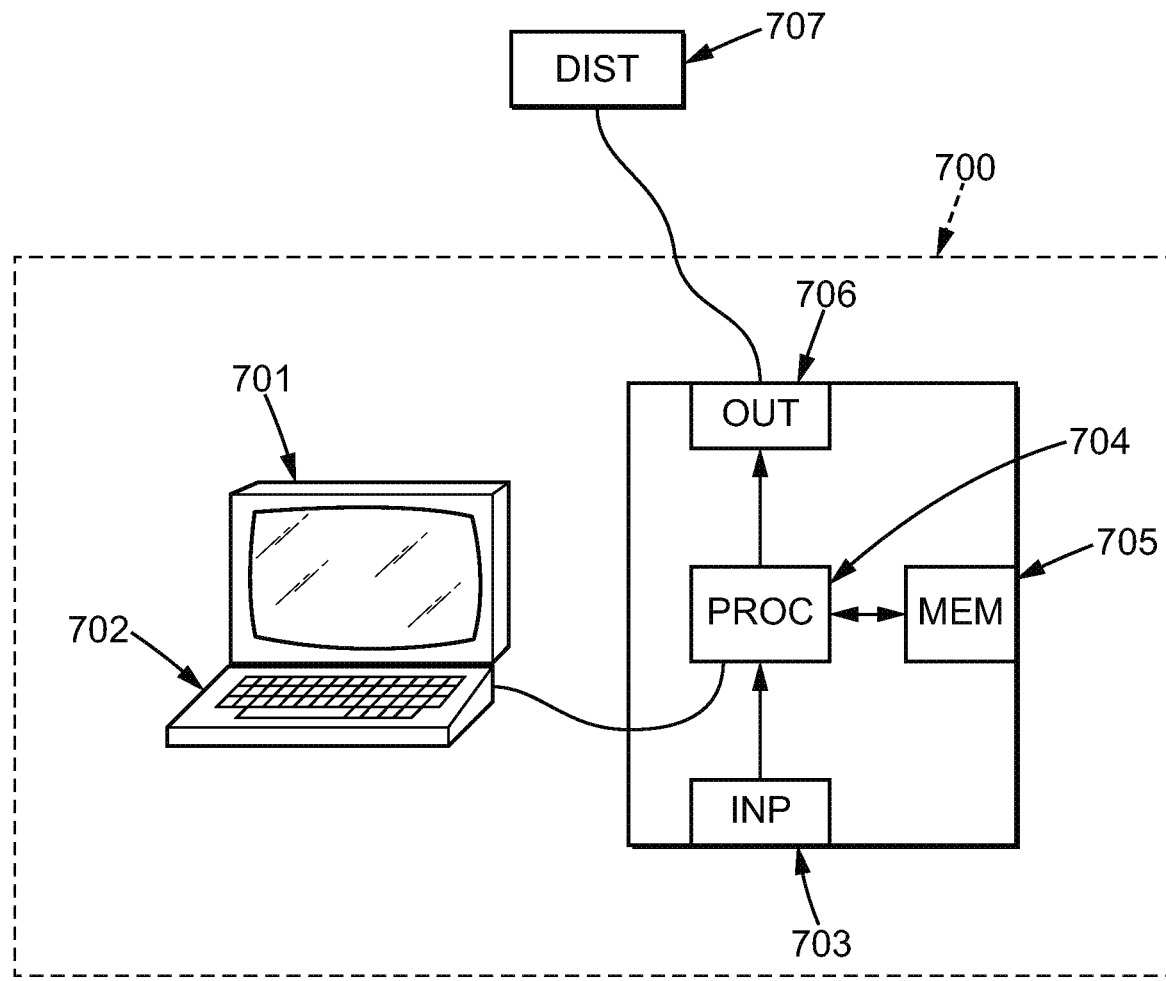
FIG. 7 illustrates a device for implementing an embodiment according to the invention.

FIG. 7 illustrates a device for implementing an embodiment according to the invention.

In this embodiment, the device comprises a computer 700, comprising a memory 705 to store instructions enabling the implementation of the method, data from measurements received, and time data to carry out different steps of the method such as described previously.

The computer additionally comprises a circuit 704. This circuit can be, for example:

a processor able to interpret instructions in the form of a computer program, or an electronic card of which the steps of the method of the invention are described in the silicon chip, or again a programmable electronic chip, like a FPGA ("Field-Programmable Gate Array") chip.

This computer comprises an input interface 703 to receive events from sensors, and an output interface 706 for the supply of distances 707. Finally, the computer can comprise, to enable easy interaction with a user, a screen 701 and a keyboard 702. Of course, the keyboard is optional, in particular as part of a computer having the form of a touchscreen tablet, for example.

Moreover, the functional diagram presented in FIG. 6 is a typical example of a program of which certain instructions can be made for the device described. In this regard, FIG. 6 can correspond to the flowchart of the general algorithm of a computer program in the sense of the invention.

Of course, the present invention is not limited to the forms of embodiment described above as an example; it extends to other variants.

Other embodiments are possible.

For example, the flowchart of FIG. 6 can also comprise an iteration on the events $e_1(p_i, t_{1i})$ in order to connect several events of the first sensor with events of the second sensor.

The invention claimed is:

1. A method of 3D reconstruction of a scene, the method comprising:

receiving a first piece of asynchronous information from a first vision sensor that has a first pixel matrix positioned opposite the scene, the first piece of asynchronous information comprising, for each pixel of the first matrix, the first successive events coming from said pixel of the first matrix;

receiving a second piece of asynchronous information from a second vision sensor that has a second pixel matrix positioned opposite the scene, the second piece of asynchronous information comprising, for each pixel of the second matrix, the second successive events coming from said pixel of the second matrix, the second sensor being separate from the first sensor;

storing the first piece of asynchronous information from the first vision sensor and the second piece of asynchronous information from the second vision sensor at a memory;

matching, by a processor in communication with the memory, a first event from among the first successive events coming from the pixel of the first matrix with a second event from among the second successive events coming from the pixel of the second matrix, the second event being determined to minimize a cost function for the first event, the cost function being a simple sum or a weighted sum of a luminance component and a movement component and a time component and a geometric component for the pixel of the first matrix and the pixel of the second matrix; and determining, by the processor, a 3D reconstruction of a scene based on the matching, the luminance component depending on at least:

a first luminance signal coming from the pixel of the first sensor convoluted with a convolution core, the luminance of said first sensor pixel depending on a difference between the maximums of said first signal, and a second luminance signal coming from the pixel of the second sensor convoluted with said convolution core, the luminance of said second sensor pixel depending on a difference between the maximums of said second signal, the movement component depending on at least:

time values relating to the occurrence of events spatially located at a predetermined distance from the pixel of the first sensor, and time values relating to the occurrence of events spatially located at a predetermined distance from the pixel of the second sensor, the time component depending on a difference between:

a first time value relating to one of the first successive events of the first sensor, and a second time value relating to one of the second successive events of the second sensor, and the geometric component depending on:

a spatial distance from the pixel of the second sensor at an epipolar straight line or at an epipolar intersection defined by at least one pixel of the first sensor.

2. The method according to claim 1, wherein the first luminance signal of the pixel of the first sensor and the second luminance signal of the pixel of the second sensor comprise a maximum, coding an occurrence time of a luminance variation, the convolution core being a predetermined Gaussian variance.

3. The method according to claim 1, wherein said luminance component additionally depends on:
  luminance signals of pixels of the first sensor, spatially located at a predetermined distance from the pixel of the first sensor, convoluted with the convolution core, and
  luminance signals of pixels of the second sensor, spatially located at a predetermined distance from the pixel of the second sensor, convoluted with the convolution core.

4. The method according to claim 1, wherein said movement component depends on:
  an average value of the time values relating to the occurrence of pixel events of the first sensor, spatially located at a predetermined distance from the pixel of the first sensor, and
  an average value of the time values relating to the occurrence of pixel events of the second sensor, spatially located at a predetermined distance from the pixel of the second sensor.

5. The method according to claim 1, wherein said movement component depends on, for a given time:
  for each current time value relating to the occurrence of events, spatially located at the predetermined distance from the pixel of the first sensor, of a function value decreasing from a distance of said given time to said current time value, and
  for each current time value relating to the occurrence of events, spatially located at the predetermined distance from the pixel of the second sensor, of a function value decreasing from a distance of said given time to said current time value.

6. The method according to claim 1, wherein said movement component depends on:
  a first convolution of a decreasing function with a signal comprising a Dirac for each time value relating to the occurrence of events, spatially located at the predetermined distance from the pixel of the first sensor, and
  a second convolution of a decreasing function with a signal comprising a Dirac for each time value relating to the occurrence of events, spatially located at the predetermined distance from the pixel of the second sensor.

7. A device for the 3D reconstruction of a scene, the device comprising:
  an interface configured to
    receive a first piece of asynchronous information from a first sensor that has a first pixel matrix positioned opposite the scene, the first piece of asynchronous information comprising, for each pixel of the first matrix, the first successive events coming from said pixel, and
    receive a second piece of asynchronous information from a second sensor that has a second pixel matrix positioned opposite the scene, the second piece of asynchronous information comprising, for each pixel of the second matrix, the second successive events coming from said pixel, the second sensor being separate from the first sensor; and
  a processor configured to
    match a first event from among the first successive events coming from the pixel of the first matrix with a second event from among the second successive events coming from the pixel of the second matrix, the second event being determined to minimize a cost function for the first event, the cost function being a simple sum or a weighted sum of a luminance component and a movement component and a time component and a geometric component for the pixel of the first matrix and the pixel of the second matrix, and
    determine a 3D reconstruction of a scene based on the matching,
    the luminance component depending on at least:
      a first luminance signal coming from the pixel of the first sensor, convoluted with a convolution core, the luminance of said first sensor pixel depending on a difference between the maximums of said first signal, and
      a second luminance signal coming from the pixel of the second sensor, convoluted with said convolution core, the luminance of said second sensor pixel depending on a difference between the maximums of said second signal, and
    the movement component depending on at least:
      time values relating to the occurrence of events, spatially located at a predetermined distance from the pixel of the first sensor, and
      time values relating to the occurrence of event, spatially located at a predetermined distance from the pixel of the second sensor,
    the time component depending on a difference between:
      a first time value relating to one of the first successive events of the first sensor, and
      a second time value relating to one of the second successive events of the second sensor, and
    the geometric component depending on:
      a spatial distance from the pixel of the second sensor at an epipolar straight line or at an epipolar intersection defined by at least one pixel of the first sensor.

8. A non-transitory computer-readable storage medium comprising instructions for the implementation of the method according to claim 1, when the method is executed by a processor.

9. The method according to claim 2, wherein said luminance component additionally depends on:
  luminance signals of pixels of the first sensor, spatially located at a predetermined distance from the pixel of the first sensor, convoluted with the convolution core, and
  luminance signals of pixels of the second sensor, spatially located at a predetermined distance from the pixel of the second sensor, convoluted with the convolution core.

10. The method according to claim 2, wherein said movement component depends on:
  an average value of the time values relating to the occurrence of pixel events of the first sensor, spatially located at a predetermined distance from the pixel of the first sensor, and
  an average value of the time values relating to the occurrence of pixel events of the second sensor, spatially located at a predetermined distance from the pixel of the second sensor.

11. The method according to claim 3, wherein said movement component depends on:
  an average value of the time values relating to the occurrence of pixel events of the first sensor, spatially located at a predetermined distance from the pixel of the first sensor, and an average value of the time values relating to the occurrence of pixel events of the second sensor, spatially located at a predetermined distance from the pixel of the second sensor.

* * * * *